Patented Aug. 24, 1948

2,447,878

UNITED STATES PATENT OFFICE 2,447,878

WOOL SHRINKPROOFING BATHS CONTAINING BUTADIENE COPOLYMERS AND THEIR UTILIZATION

John B. Rust, Montclair, N. J., assignor to Montclair Research Corporation, a corporation of New Jersey No Drawing. Application August 28, 1945, Serial No. 613,201

10 Claims. (Cl. 260—29.7)

This invention relates to shrinkproofing wool, to copolymerization products useful for that purpose, to emulsions and compositions containing such polymerization products, and to methods of making such products and compositions and of treating wool therewith.

Among materials that have heretofore been suggested for the treatment of wool, may be mentioned methacrylate resins, butadiene copolymers, etc. Those suggestions in the art treat all of these polymeric substances as equivalent for all fibers. But investigation proves that such suggestions are erroneous because while any of the synthetic resins referred to can be applied to wool for example, they are not equally efficacious in effecting a shrinkproofing effect. And this is true even of copolymers of butadiene 1.3 derivatives.

Among the objects of the present invention is the production of copolymers particularly valuable in the shrinkproofing of wool but having other utilities as well.

Further objects include the production of baths, emulsions and compositions containing such copolymers.

Further objects include methods of preparing such copolymers and baths, emulsions and compositions containing them.

Still further objects include methods of treating wool for shrinkproofing.

Other objects and advantages of the invention will appear from the more detailed description set forth below, it being understood that this more detailed description is given by way of explanation and illustration only, and not by way of limitation, since various changes therein may be made by those skilled in the art without departing from the scope and spirit of the present invention.

In accordance with the present invention it has been found that copolymers of a butadiene 1.3 and a benzene containing an unsaturated side chain of two carbon atoms may be prepared and utilized to give excellent shrinkproofing of wool. Such copolymers may be prepared at high speeds in a relatively short time to produce copolymers possessing valuable properties.

As illustrative of the butadiene 1.3 derivative, there may be mentioned particularly, butadiene 1.3, isoprene, dimethyl butadiene, ethyl butadiene, methoxy and ethoxy butadiene, cyanobutadiene, chloroprene, etc., and mixtures thereof.

As illustrative of the copolymerizing benzene derivative there may be particularly mentioned styrene $\alpha\beta$-dimethyl styrene, dichlorstyrene and phenylacetylene, etc., and mixtures thereof.

While various methods of producing the copolymers may be employed, the most desirable method is to carry out the polymerization in an aqueous medium or emulsion in the presence of a polymerization catalyst. The conditions of reaction determine the speed or reaction velocity as well as the characteristics of the products obtained; although the nature of the interpolymerizing constituents has an important effect on those characteristics; and in some instances the proportions of the copolymer ingredients affect the properties insofar as shrinkproofing of wool is concerned. The preferred process includes the steps of heating a mixture of the constituents to be copolymerized with water in the presence of an emulsifying agent and a polymerization catalyst, particularly a peroxide catalyst, in a pressure reactor at a controlled temperature and pH, using agitation to maintain a good emulsion. In this way, emulsions containing the copolymer may be directly obtained and utilized by adjustment and additions as the treating bath for treating the wool to produce shrinkproofing.

By utilizing pressures in excess of atmospheric, the time periods involved may be greatly shortened and the reactions greatly accelerated even at relatively low orders of temperature, to give very satisfactory products. As indicated above, a satisfactory way of carrying out the reaction under pressure is to utilize the stated constituents and reaction mixtures in a closed reactor or reaction vessel, the pressures required being generated under such conditions.

An important consideration in control of the character of product obtained, is the pH at which the reaction is carried out. Desirably, a relatively constant pH should be maintained. The particular pH employed depends upon the particular substances being polymerized and also depends upon the mode of polymerization. Desirably therefore, where the polymerization is carried out in an aqueous emulsion, the pH should be accurately adjusted as by neutralization and stabilized as by means of suitable buffering agents at that value best suited for the emulsifying agent employed. Depending upon the individual reactants and the conditions of the reaction, the polymerization may be carried out at a controlled pH between 4 and 11. A pH within the range of 7-11 is preferred.

As buffers there may be mentioned solutions of acetates, borates, phosphates, and the like, or mixtures thereof. The pH employed depends in part on the type of emulsifying agent used. Emulsifying agents should be used which are stable at the pH concentration employed. With an emulsifying agent which is most efficient under acid conditions, a pH below 7 is desirable. On the other hand, with emulsifying agents which are most efficient under basic conditions, a pH above 7 should be employed.

As emulsifying agents, there may be employed a wide range of materials such as sodium lauryl sulfate, sodium alkyl naphthalene-sulfonate, higher esters of sodium sulfosuccinic acid, sodium oleate, triethanolamine oleate, and the like. The amount of emulsifying agent may be varied depending upon the conditions of agitation. Commonly there may be used about 5% of emulsifying agent based on the water phase, but with vigorous agitation considerably less may be employed. Since soap is the cheapest emulsifying agent, and since its emulsions can be easily broken by addition of a small quantity of acid, it is the preferred emulsifier. The proportion of water to be used in the emulsion is subject to wide variation. However, avoiding unnecessarily large quantities of water, enables smaller equipment to be employed.

Reaction temperatures of from 30 to 100° C. may be employed, but more desirably the reaction is carried out between temperatures of 30 to 60° C., particularly under the preferred conditions of operations as illustrated herein.

As indicated, the reaction is desirably carried out in the presence of a polymerization catalyst and any suitable oxygen-giving compound may thus be employed. Preferably the less expensive material such as hydrogen peroxide, ammonium persulfate, benzoyl peroxide, and the like may be utilized.

While additive agents in the emulsion are not necessary, they are often advantageous. Protective colloids may be employed such as gelatin, glue, methyl cellulose, agar agar, alginates, pectates, egg albumin, and the like.

The temperature, amount of catalyst, emulsifying agent, efficiency of agitation, additive agents, and the like, all have an influence on the velocity of the reaction. When the reaction has proceeded as far as desired, there may be added an antioxidant such as phenyl beta naphthylamine, alkyl aromatic amine, hydroquinone monobenzyl ether, and the like. The presence of antioxidant has an important effect other than merely as an antioxidant in the usual sense, since the presence of such materials in the emulsions and baths used for shrinkproofing wool, exert an effect whereby the shrinkproofing is enhanced beyond that obtained in its absence. So that antioxidants in these cases have an unexpected and unpredictable effect.

The interpolymerization products are produced in latex-like form when the reactions are carried out in aqueous emulsion as indicated above, and such latex-like products may be utilized as such, for example, in the treatment of textiles, preferably after adjustment as indicated below, or they may be employed in other ways.

As formed, the emulsions contain the copolymer in a condition in which it is unsuitable as synthetic rubber or rubber-like material. If coagulated by any suitable means, the emulsions give crumbly materials which cannot be milled or sheeted as on rubber milling equipment in the way that rubber is manipulated. The copolymer is in the form where extensive cross-linking has occurred as further pointed out below.

To enhance such materials for use for shrinkproofing, they may desirably be given an oxidation treatment, preferably while in aqueous emulsion as obtained from the polymerization step, to convert them into what may be called a prevulcanized condition so that upon deposition of the polymer on, in or about the fibers or textiles, the polymer is in a non-tacky condition and gives a non-tacky deposit. Or the polymer in such emulsions utilized in accordance with the present invention is in a condition in which it is substantially insoluble in organic solvents such as benzene, toluene, xylene, carbon tetrachloride, chloroform, and tetrachlorethane, but, however, may be swollen to some extent with such solvents. The vulcanization has been carried to a point where substantially no soluble polymer remains, but, as stated above, the gel-forming polymer may be swollen to some extent with the stated solvents.

Where such pre-vulcanization by oxidation is employed, the emulsions are prepared by carrying out the polymerization in the presence of polymerizing agents in which emulsions the polymer or copolymer is present in such condition that if deposited on fibers a tacky deposit would be obtained, or the polymer is substantially soluble in common organic solvents at this time, or is incompletely vulcanized, and second, the emulsion prepared in the first step is subjected to an oxidative treatment by means of hydrogen peroxide or other substances which liberate oxygen under the conditions of treatment to convert the polymer or copolymer present in such emulsions into a condition where upon deposition on fibers it gives a non-tacky deposit, or gives a deposit which is substantially insoluble in common organic solvents, or is substantially completely vulcanized and in the form of a cross-linked polymer. The first step is carried to a point of substantially complete polymerization, by which is meant little or no monomer is present. The emulsion at this point may be subjected to vacuum or other treatment to remove any volatile hydrocarbons which may be present, before the step of oxidative vulcanization. The term oxidative pre-vulcanization may be used to describe the final condition of the polymer in the emulsion without any implication that an oxygen link is necessarily involved.

Such oxidative pre-vulcanization may be carried out at temperatures for example of 70-100° C., with oxygen yielding substances such as hydrogen peroxide, benzoyl peroxide, ammonium persulfate, acetyl peroxide, butyl hydroperoxide, butyl perbenzoate, etc. for a period of from 45 minutes to 1½ hours. Such oxidative treatment of the emulsion is desirably carried out in the absence of the antioxidants, the latter being added after the oxidation treatment has been carried to the point desired. This addition of antioxidant is desirable so that further oxidative change will not continue after the material has been applied to the textile.

The emulsions produced as set forth above may be used for the treatment of wool either as raw wool, yarn, knit, woven goods or mixed goods, etc. The wool to be treated is entered into the bath containing the copolymer produced as set forth above. Water may be added to such emulsions to produce the desired bath content. The bath should contain the copolymer in an amount to give, under the conditions of treatment, a wool having from 1% to 25% of copolymer based on the weight of the wool. The bath is desirably conditioned by adding to it a sufficiently strong electrolyte to allow the deposition of the copolymer on the wool fibers. It has been found that in such a bath no deposition of copolymer occurs under ordinary conditions. However, upon the addition of an electrolyte, exhaustion of the bath will take place with varying rapidity, depending mainly upon temperature and electrolyte concentration. Without any limitation by way of theoretical considerations, it is believed that reversal of the electrical charge on the colloidal particles of the copolymer takes place on addition of the electrolyte enhancing the affinity of the copolymer for the fiber. The proportion of the electrolyte added would be insufficient to account on a theoretical basis for the salting out of the copolymer particles. Thus the effect must be one of electrical charge rather than precipitation by coagulation. When the electrolyte is added to the treated bath there is no coagulation or precipitation even on heating for relatively long periods of time. It is only in the presence of fibers that deposition occurs. This is additional proof that electrical charge of the particles is involved rather than a salting out effect.

The ratio of the copolymerizing constituents may be varied substantially and a pronounced shrinkproofing effect obtained. With styrene, the best results were obtained with not more than 30% based on the weight of the copolymer, but a definite improvement was noticeable up to 60% styrene. With dimethyl styrene, dichlorostyrene, and phenylacetylene, substantial improvement over the untreated wool was obtained with varying ratios, very marked effects being obtained with ratios respectively of 10–40% dimethylstyrene and dichlorostyrene, and from 10–20% of phenylacetylene.

The electrolyte content may vary over substantial limits but sufficient electrolyte should be present to condition the bath so that the bath, although stable in the presence of the wool fibers, will deposit the polymer in the presence of the conditioning electrolyte. Thus the electrolyte content may vary from about 25% to about 500% based on the weight of the copolymer present. The following are exemplary: sodium sulphate, chloride, bromide, iodide, sulfite, bisulfate, bisulfite, nitrate, acetate and the like, or the corresponding potassium, lithium, caesium salts, etc. Salts like zinc chloride may also be used where the coagulation does not appear to be too serious since it occurs in small particulate form and the particles may be redispersed by stirring. As such electrolyte water-soluble salts may be used; desirably such salts which do not precipitate the polymer, neutral salts, specifically salts of strong bases and strong acids, particularly inorganic salts are preferred. The term "conditioning electrolyte" is used hereinafter to cover such electrolytes which produce the desired deposition of the polymer. It has been found that it is possible to deposit the emulsions of the present invention on wool at a pH of 7 or even slightly higher. However, it is preferred to operate at a pH of 7 or below since under these conditions more rapid dispersal is effected.

The operation is desirably carried out at a temperature sufficient to give exhaustion of the bath with the particular emulsion being used. This will vary with different emulsions. While lower temperatures may be used, the operation is desirably carried out at temperature ranges from 40° C. to the boiling point of the bath.

The polymer can be applied before or after fulling, weaving, scouring and the like operations. In some cases it can be applied in the dye bath. Mixed goods including wool-cotton, wool-rayon and so forth can be treated by this method without any deleterious effect. If desired the wool may be subjected to a pretreatment, as for example, chlorination or bromination, before being treated in accordance with the present invention.

As emulsifying agents, anionic emulsifying agents which are stable at or below pH 7 are preferred. Such emulsifying agents are exemplified by sodium lauryl sulfonate, sodium alkyl naphthalene sulfonates, long chain alkyl sodium sulfonates or sulfates, sodium dioctyl sulfosuccinate and so forth. There may also be used neutral non-cationic emulsifying agents such as mannitol monolaurate, the reaction products of protein derivative products with acid chlorides, ethylene oxide reaction products with fatty acids, fatty alcohols and the like.

Emulsions of the copolymers used in accordance with the present invention are preferably but not necessarily those which have been carried to a 100% polymerization. When 100% polymer is obtained, considerable cross linking occurs in the polymer with consequent insolubility in organic solvents. Thus a type of prevulcanizing of the polymer has been obtained. It is also possible to vulcanize the copolymers with mixtures of vulcanizing accelerators such as thiuram disulfide and so forth, vulcanizing agents such as sulfur, dinitrobenzene, alkyl phenol sulfide and so forth, either previously or subsequently to deposition or dyeing into the wool fibers.

The treatment of wool fibers is particularly emphasized herein, although animal fibers such as silk and protein fibers such as "Aralac" (a casein fiber) may also be treated in accordance with this invention.

After treatment in accordance with the present invention, the wool is rinsed and dried. Its properties have been altered to such a degree that it no longer has a tendency to felt during washing and consequently is non-shrinking. Although it is not intended that the invention be limited by theoretical considerations, it is thought that the copolymer particles applied as set forth in this description distribute themselves among the fibers of the wool and in some instances fill the interstices of the wool scales, thus preventing an intertwining and consequent felting of the wool. Thus the deposited copolymer would prevent intertwining of the wool fibers and also permit relatively easy slippage of the fibers one on the other.

The following examples illustrate the invention, the parts being by weight unless otherwise indicated.

*Example 1.*—A series of butadiene-styrene emulsions was prepared using butadiene and styrene in the proportions shown in columns A and B of Table I.

Table I

|   | A<br>Parts Butadiene | B<br>Parts Styrene |
|---|---|---|
| 1 | 45 | 5 |
| 2 | 40 | 10 |
| 3 | 35 | 15 |
| 4 | 30 | 20 |
| 5 | 25 | 25 |
| 6 | 20 | 30 |
| 7 | 15 | 35 |
| 8 | 10 | 40 |

In all cases the butadiene which had been passed over $CaCl_2$ was condensed in pressure reactors cooled to below −5° C. While the reactors were kept in the freezing mixture, the styrene which had previously been distilled was added, followed in each case by 100 parts of a buffer solution of pH 11, 5 parts of 30% hydrogen peroxide and 5 parts of sodium laurylsulfate. The buffer solution consisted of 35.8 parts of disodium phosphate and 7.16 parts of trisodium phosphate dissolved in 980 parts of distilled water. The reactors were then taken out of the freezing mixture and closed immediately.

The reactors were left standing for about 2 hours and allowed to come to room temperature. They were then heated under controlled conditions to 45° C. and agitated continuously. The reactors were taken out after 17 hours, cooled and opened. None of the reactors showed any pressure on opening. Complete polymerization was thus indicated and the solid content of each of these emulsions was 33⅓%.

*Example 2.*—The emulsions made according to Example 1 were applied to hand knit samples of wool approximately 7″ x 5″ in size. For each wool sample an amount of emulsion of Example 1 containing a weight of solids corresponding to 6% of the weight of the wool sample to be treated was weighted out. Columns C and D in Table II show the weights of the wool samples and the respective amounts of emulsion used. The emulsions were added to 200 parts of water and the bath was conditioned with an electrolyte consisting of 1 part of anhydrous sodium sulfate, then 1 part of 10% sulfuric acid was added to bring the pH of the treating bath below 7. The wool samples were then immersed in the cold bath, which was then heated to 60–70° C. and kept at that temperature. The wool sample was agitated in the bath continuously. After 20 minutes at 60–70° C. the bath was not yet exhausted and another portion of 1 part of anhydrous sodium sulfate was added. A half hour later the bath was clear, i. e., all the latex had been exhausted. The wool samples were taken out of the bath, rinsed with warm water and dried.

Table II

|   | A<br>Parts Butadiene | B<br>Parts Styrene | C<br>Parts Wool | D<br>Parts Emulsion | E<br>Felting and Shrinking |
|---|---|---|---|---|---|
| 1 | 45 | 5 | 14.35 | 2.58 | Slight. |
| 2 | 40 | 10 | 15.70 | 2.82 | Do. |
| 3 | 35 | 15 | 17.10 | 3.08 | Do. |
| 4 | 30 | 20 | 15.25 | 2.75 | Considerable. |
| 5 | 25 | 25 | 16.80 | 3.02 | Do. |
| 6 | 20 | 30 | 16.00 | 2.88 | Do. |
| 7 | 15 | 35 | 14.40 | 2.59 | Bad. |
| 8 | 10 | 40 | 15.00 | 2.70 | Do. |

The wool samples were then washed in an electric washing machine using 25 parts of powdered soap for 13,000 parts of hot water at 70° C. The samples were given 6 washings of one hour each, and were rinsed and dried between washings. The extent of the felting and shrinking caused by the washings is shown in column E of Table II. The lower percentages of styrene stood up much better. Best results were obtained with 30% of styrene or less, but a definite improvement over untreated wool was noticeable up to 60% styrene.

*Example 3.*—A series of $\alpha,\rho$-dimethyl styrene-butadiene copolymer emulsions was prepared and the monomers were used in the proportions shown in columns A and B in Table III.

Table III

| Emulsion No. | Parts Dimethyl Styrene | Parts Butadiene |
|---|---|---|
| 1 | 2.5 | 22.5 |
| 2 | 5.0 | 20.0 |
| 3 | 7.5 | 17.5 |
| 4 | 10.0 | 15.0 |

The butadiene was passed over $CaCl_2$ and condensed in pressure reactors cooled to below −5° C. The exact amount of butadiene was then weighed out in the pressure reactors and the $\alpha,\rho$-dimethyl styrene, which had previously been distilled, was added, followed in each case by 50 parts of a buffer solution of pH 11, 3 parts of a 10% ammonium persulfate solution and 2.5 parts of sodium lauryl sulfate. The buffer solution had been made up by dissolving 35.8 parts of disodium phosphate and 7.16 parts of trisodium phosphate in 980 parts of distilled water. The reactors were closed and allowed to come to room temperature. They were then put in an agitator with a constant temperature bath at 45° C.

The reactors were taken out of the agitator at the end of 24 hours. They were cooled and opened. The reactors showed only slight pressure, and complete polymerization was assumed in all cases, which meant that the polymer content of each emulsion was 33⅓%.

*Example 4.*—The four emulsions made according to Example 3 were applied to samples of wool flannel, 10″ x 10″ in size, on which four lengths of 8″ each had been marked, two lengths in the direction of the warp, two lengths in the direction of the fill.

The samples weighed approximately 13.5 parts each. An amount of emulsion containing a weight of polymer corresponding to 4.5% of the weight of the wool sample was added to 270 parts of water (20 times the weight of the wool sample), and 2 parts of 50% acetic acid. Approximately 3.5 parts of anhydrous sodium sulfate were dissolved in 50 parts of water.

The wool sample was wetted in water at 30° C. for 10 minutes and was then immersed in the bath at room temperature containing the emulsion and acid in water. The bath was heated to 60° C. in the course of 15 minutes. Half of the sodium sulfate solution was then added. The bath was kept at 60° C. and 15 minutes later the second half of the salt solution was added. In all four cases the bath was exhausted 20–25 minutes after the second salt addition. Thus the total exhaustion time, counted from the immersion of the wool sample in the bath, was 50–55 minutes. The wool samples were rinsed and dried, and the marked lengths were re-measured.

The four samples and one untreated control sample, which had also four 8″ lengths marked on it, were washed for 6 hours in a washing machine using 35 parts of powdered soap for 18,500 parts of hot water at 70° C. The samples were then rinsed and dried, and the marked lengths on the samples were measured again.

*Table IV*

| Sample | A Dimethyl Styrene | A Parts Butadiene | C Per Cent Shrinkage | | D Felting |
|---|---|---|---|---|---|
| | | | Warp | Fill | |
| 1 | 2.5 | 22.5 | 7.9 | 2.5 | Slight. |
| 2 | 5.0 | 20.0 | 7.1 | 3.5 | Do. |
| 3 | 7.5 | 17.5 | 6.9 | 3.8 | Do. |
| 4 | 10.0 | 15.0 | 9.8 | 4.0 | Do. |
| 5 Control Sample | | | 28.0 | 12.0 | Bad. |

Table IV shows the extent of the shrinkage and felting caused by the washing. From these data it is evident that all four emulsions made from dimethyl styrene were very good shrinkproofing agents.

*Example 5.*—A series of dichlorostyrene-butadiene copolymer emulsions was prepared using the monomers in the proportions shown in Table V

*Table V*

| Emulsion | A Parts Dichlorostyrene | B Parts Butadiene |
|---|---|---|
| 1 | 2.5 | 22.5 |
| 2 | 5.0 | 20.0 |
| 3 | 7.5 | 17.5 |
| 4 | 10.0 | 15.0 |

The butadiene was passed over calcium chloride and then condensed in pressure reactors cooled to below −5° C. The exact amount of butadiene was weighed out in the pressure reactors and the dichlorostyrene, which had been previously distilled, was added. This was followed in each case by 50 parts of a buffer solution of pH 11, 3 parts of 10% ammonium persulfate solution, and 2.5 parts of sodium lauryl sulfate. The buffer solution had been made up by dissolving 35.8 parts of disodium phosphate and 7.16 parts of trisodium phosphate in 980 parts of distilled water. The reactors were closed and allowed to come to room temperature. They were then put in an agitator with a constant temperature bath at 45° C.

At the end of 24 hours the reactors were taken out of the agitator, cooled and opened. They showed only slight pressure, and complete polymerization was assumed in all four cases, which meant a polymer content of 33⅓% for each emulsion.

*Example 6.*—The four emulsions made according to Example 5 were applied to 10″ x 10″ samples of wool flannel, on which four lengths of 8″ each had been marked, two lengths in the direction of the warp, two lengths in the direction of the fill.

The samples weighed approximately 13.5 parts each. An amount of emulsion containing a weight of polymer corresponding to 4.5% of the weight of the wool sample was added to 270 parts of water (20 times the weight of the wool), and 2 parts of 50% acetic acid. Approximately 3.5 parts of anhydrous sodium sulfate (26.5% of the weight of the wool) were dissolved in 50 parts of water.

The wool sample was wetted in water at 30° C. for 10 minutes and was then immersed in the bath at room temperature containing the emulsion and acid in water. The bath was heated to 60° C. in the course of 15 minutes and half of the salt solution was now added. After 15 minutes this was followed by the second half of the salt solution. The sample was then kept in the bath at 60° C. until exhaustion occurred, indicated by clearing of the bath. For all four emulsions this took place 30–40 minutes after the second salt addition. The wool samples were rinsed and dried, and the marked lengths re-measured.

These four samples and one untreated control sample, which had also four 8″ lengths marked on it, were washed for 6 hours in a washing machine using 35 parts of powdered soap for 18,500 parts of hot water at 70° C. The samples were then rinsed, dried and measured.

*Table VI*

| Sample Number | A Parts Dichlorostyrene | B Parts Butadiene | C Per Cent Shrinkage | | D Felting |
|---|---|---|---|---|---|
| | | | Warp | Fill | |
| 1 | 2.5 | 22.5 | 5.6 | 3.0 | Slight. |
| 2 | 5.0 | 20.0 | 5.1 | 2.5 | Do. |
| 3 | 7.5 | 17.5 | 5.3 | 1.9 | Do. |
| 4 | 10.0 | 15.0 | 5.9 | 2.2 | Do. |
| 5 Control Sample | | | 28.0 | 12.0 | Bad. |

Table VI shows the extent to which shrinkage and felting were caused by the washing. It indicates clearly that the treated samples are all far superior to the untreated sample and that all four emulsions tried have approximately the same effect.

*Example 7.*—Two phenyl acetylene-butadiene copolymer emulsions were prepared with the monomers in the proportions indicated in Table VII.

*Table VII*

| Emulsion Number | A Parts Phenyl Acetylene | B Parts Butadiene |
|---|---|---|
| 1 | 2.5 | 22.5 |
| 2 | 5.0 | 20.0 |

The butadiene, which had been passed over calcium chloride, was condensed in pressure reactors cooled to below −5° C. and the exact amount of butadiene was weighed out in the reactors. To this was added the phenyl acetylene, which had previously been distilled at 140–155° C. This was followed in both cases by 50 parts of a buffer solution of pH 11, 2.5 parts of a 30% solution of hydrogen peroxide and 2.5 parts of sodium lauryl sulfate. The buffer solution consisted of 35.8 parts of disodium phosphate and 7.16 parts of trisodium phosphate dissolved in 980 parts of distilled water. The reactors were closed and allowed to come to room temperature, and were then put in an agitator with a constant temperature bath at 45° C.

After 16 hours the reactors were taken out of the agitator, cooled and opened. They showed some pressure and foaming, indicating incomplete polymerization. The solid content of these emulsions was, therefore, determined and was found to be 30% for emulsion #1 and 28% for emulsion #2.

*Example 8.*—The two emulsions prepared according to Example 7 were applied to samples of Wool flannel, 10" x 10" in size, on which four lengths of 8" had been marked, two lengths in the direction of the warp, two lengths in the direction of the fill. This wool flannel was, however, a type of material different from that used in Examples 4 and 6.

The samples weigh 12.36 and 12.06 parts respectively. An amount of emulsion containing a weight of polymer corresponding to 6% of the weight of the wool sample was added to 250 parts of water and the bath was conditioned by the addition of 1.0 part of 10% sulfuric acid and 1.0 part of anhydrous sodium sulfate. The sample was now immersed in the bath and the bath heated to 60–70° C. After 10 minutes at 60–70° C. another portion of 1.0 part of anhydrous sodium sulfate was added followed at intervals of 5–10 minutes by two portions of 2.0 parts each, and two portions of 1.0 part each of anhydrous sodium sulfate. Thus, including the initial amount, a total of 8.0 parts of anhydrous sodium sulfate was added. After 60 minutes at 60–70° C. for emulsion #1 and after 70 minutes for emulsion #2 the bath was exhausted. The sample was taken out, rinsed and dried, and the marked lengths measured.

These two samples and one untreated sample of the same material were then washed for 6 hours in a washing machine using 25 parts of powdered soap for 13,000 parts of hot water at 70° C. The samples were then rinsed, dried and measured.

*Table VIII*

| Sample | A<br>Parts Phenyl Acetylene | B<br>Parts Butadiene | C<br>Percent Shrinkage | | D.<br>Felting |
|---|---|---|---|---|---|
| | | | Warp | Fill | |
| 1 | 2.5 | 22.5 | 2.3 | 0.39 | Very slight. |
| 2 | 5.0 | 20.0 | 4.7 | 0.78 | Do. |
| 3 | Control Sample | | 9.0 | 6.7 | Considerable. |

Table VIII lists the extent of the shrinkage and felting caused by the washing. The data show that the two phenyl acetylene butadiene emulsions are effective agents to reduce shrinkage and felting on wool camples.

Having thus set forth my invention, I claim:

1. A bath suitable for shrinkproofing wool while retaining substantially normal hand which comprises an aqueous substantially stable emulsion containing a synthetic copolymer of 100% polymerization, of butadiene 1.3 and from 10 to 60% by weight in the copolymer of a benzene containing an unsaturated side chain of two carbon atoms selected from the group consisting of styrene, $\alpha,\rho$-dimethyl styrene, dichloro-styrene, and phenyl-acetylene, in amount to give 1 to 25% by weight of copolymer deposition on the wool, a non-cationic emulsifying agent, and at least 25% by weight on the copolymer of a water-soluble neutral salt of an alkali metal as conditioning electrolyte, the pH of the bath being below 7.

2. A bath as set forth in claim 1, in which the emulsifying agent is anionic.

3. A bath as set forth in claim 1, in which the benzene derivative is styrene, the amount of styrene not exceeding 60% by weight of the copolymer.

4. A bath as set forth in claim 1, in which the benzene derivative is $\alpha,\rho$-dimethyl styrene, the amount of $\alpha,\rho$-dimethyl styrene not exceeding 40% by weight of the copolymer.

5. A bath as set forth in claim 1, in which the benzene derivative is dichloro-styrene, the amount of dichlorostyrene not exceeding 40% by weight of the copolymer.

6. The method of shrinkproofing wool which comprises immersing the wool in a heated bath as set forth in claim 1, at a temperature from 40° C. to the boiling point of the bath.

7. A bath as set forth in claim 1, including an antioxidant for the copolymer.

8. A bath as set forth in claim 1, in which the benzene derivative is styrene, the amount of styrene not exceeding 60% by weight of the copolymer, the bath including an antioxidant for the copolymer.

9. A bath as set forth in claim 1, in which the benzene derivative is $\alpha,\rho$-dimethyl styrene, the amount of $\alpha,\rho$-dimethyl styrene not exceeding 40% by weight of the copolymer, and the bath includes an antioxidant for the copolymer.

10. A bath as set forth in claim 1, in which the benzene derivative is dichloro-styrene, the amount of dichloro-styrene not exceeding 40% by weight of the copolymer, and the bath includes an antioxidant for the copolymer.

JOHN B. RUST.

REFERENCES CITED

The following references are of record in the file of this patent:

UNITED STATES PATENTS

| Number | Name | Date |
|---|---|---|
| 1,938,730 | Tschunkur et al. | Dec. 12, 1933 |
| 2,305,025 | Muhlhausen et al. | Dec. 15, 1942 |
| 2,335,124 | Konrad et al. | Nov. 23, 1943 |
| 2,340,358 | Young | Feb. 1, 1944 |